United States Patent [19]

Gardiner et al.

[11] Patent Number: 4,966,690

[45] Date of Patent: Oct. 30, 1990

[54] CHLORINE INDUCTION APPARATUS FOR TREATMENT OF WASTEWATER

[76] Inventors: Jack C. Gardiner, 8919 Bold Forest, Houston, Tex. 77088; Russell P. Holland, II, 2227 River Ford Dr., Kingwood, Tex. 77339

[21] Appl. No.: 370,149

[22] Filed: Jun. 21, 1989

Related U.S. Application Data

[63] Continuation of Ser. No. 115,172, Oct. 30, 1987, abandoned, which is a continuation-in-part of Ser. No. 783,128, Oct. 2, 1985, abandoned.

[51] Int. Cl.[5] ............................................. C02F 1/76
[52] U.S. Cl. .................................... 210/86; 210/198.1; 210/206; 210/219; 210/232; 261/93; 366/102; 366/142; 366/164
[58] Field of Search ............... 210/86, 198.1, 199, 210/205, 206, 208, 219, 220, 221.2, 749, 753, 754, 756, 232; 277/DIG. 6; 384/320, 476, 481; 261/87, 93; 366/102, 142, 164, 169, 348

[56] References Cited

U.S. PATENT DOCUMENTS

| | | | |
|---|---|---|---|
| 2,239,152 | 4/1941 | Jacobsen | 366/164 |
| 2,590,581 | 3/1952 | Shirley | 261/93 |
| 2,928,665 | 3/1960 | Epprecht | 261/87 |
| 3,400,918 | 9/1968 | MacLaren | 261/87 |
| 3,445,829 | 12/1970 | Stoll et al. | 384/481 |
| 3,545,829 | 12/1970 | Stoll et al. | 384/481 |
| 3,584,840 | 6/1971 | Fuchs | 261/87 |
| 3,782,697 | 1/1974 | Karg | 366/164 |
| 4,240,990 | 12/1980 | Inhofer et al. | 366/102 |
| 4,308,221 | 12/1981 | Durda | 366/102 |
| 4,313,827 | 2/1982 | Ratigan et al. | 210/754 |
| 4,313,898 | 2/1982 | Schurch | 366/102 |
| 4,437,765 | 3/1984 | Seeger | 366/264 |
| 4,490,049 | 12/1984 | Sanders et al. | 366/164 |

*Primary Examiner*—Peter Hruskoci
*Attorney, Agent, or Firm*—Dodge, Bush & Moseley

[57] ABSTRACT

In accordance with illustrative embodiments of the present invention, a chlorine gas inductor unit for use in wastewater treatment includes an elongated bearing frame having upper and lower bearing housings secured to the opposite ends of a tubular member, a drive shaft extending axially through the bearing frame and being supported by bearings in the upper and lower housings, a mechanical seal housing mounted at the lower end of the bearing frame and housing a face seal assembly that prevents contamination of a non-hydrocarbon lubricating oil contained in the bearing frame with wastewater or chlorine gas, the drive shaft having a short-length portion extending below the seal housing, a propeller mounted on the lower end of the drive shaft and driven at high speed to cause a high velocity flow of wastewater, and orifice means responsive to rotation of the propeller and such high velocity flow to cause chlorine gas from a remote supply to be sucked through the orifice means and mixed with the wastewater flow.

28 Claims, 5 Drawing Sheets

FIG.1
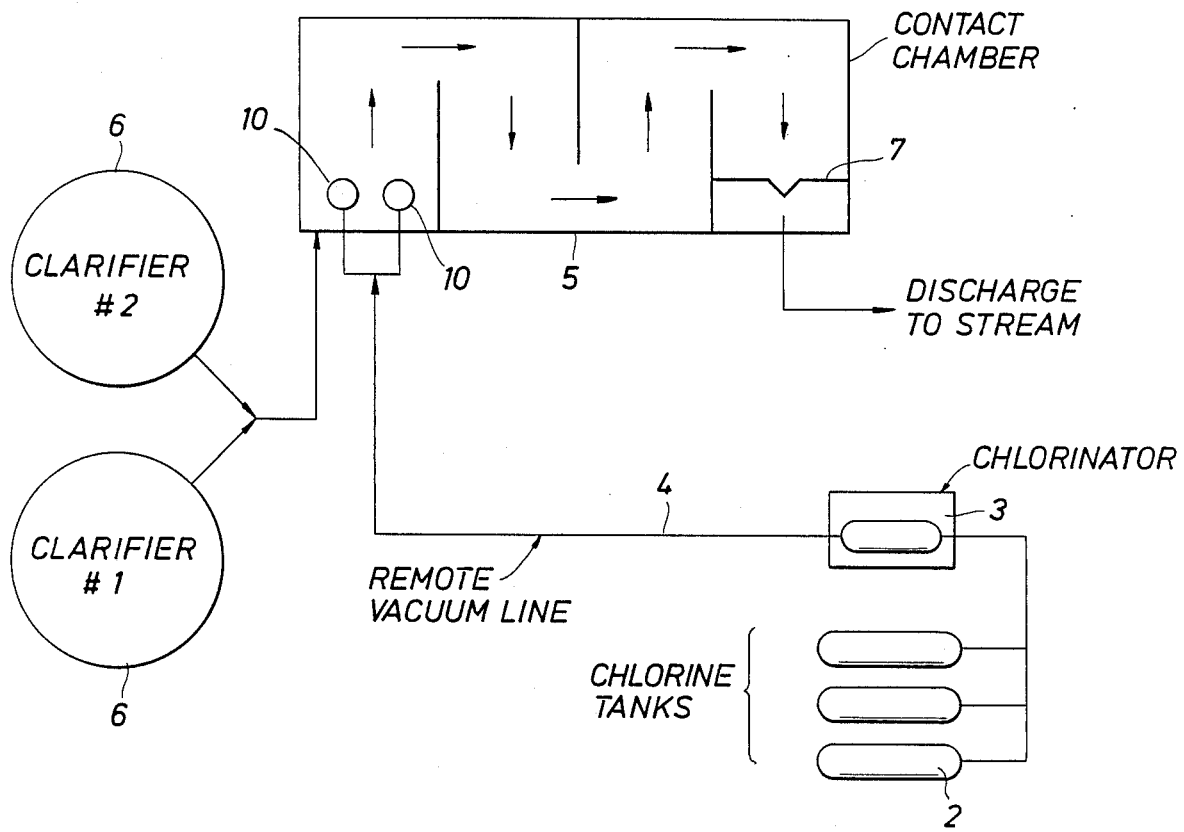
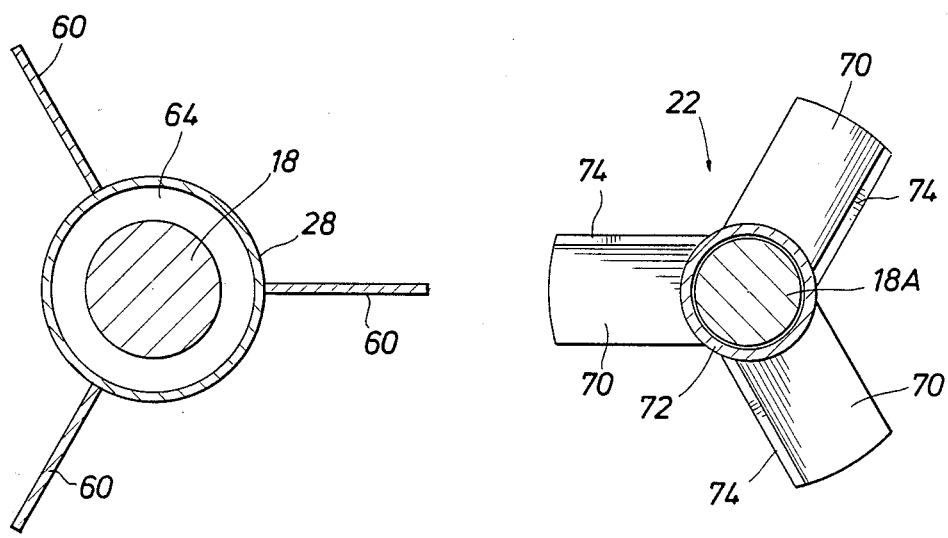
FIG.4     FIG.5

FIG. 2
FIG. 3
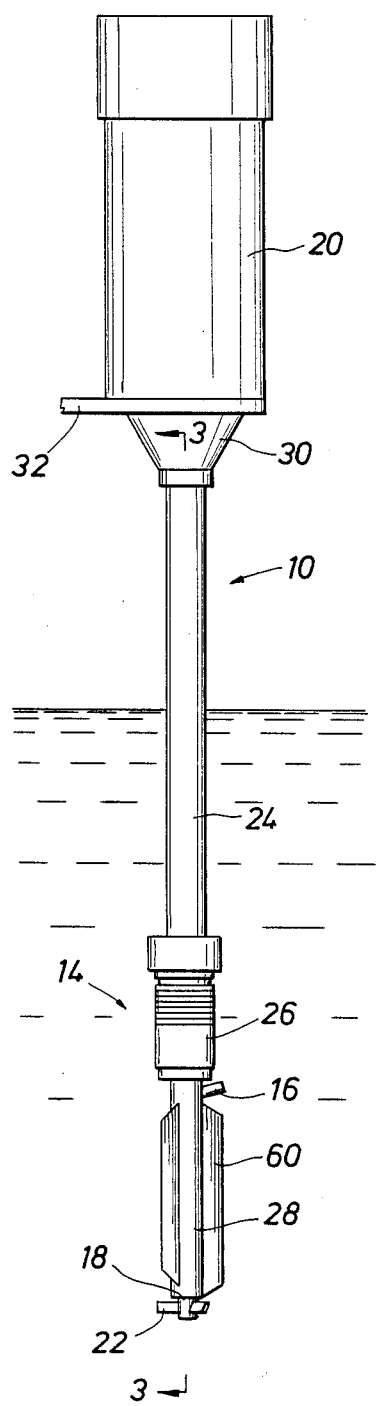
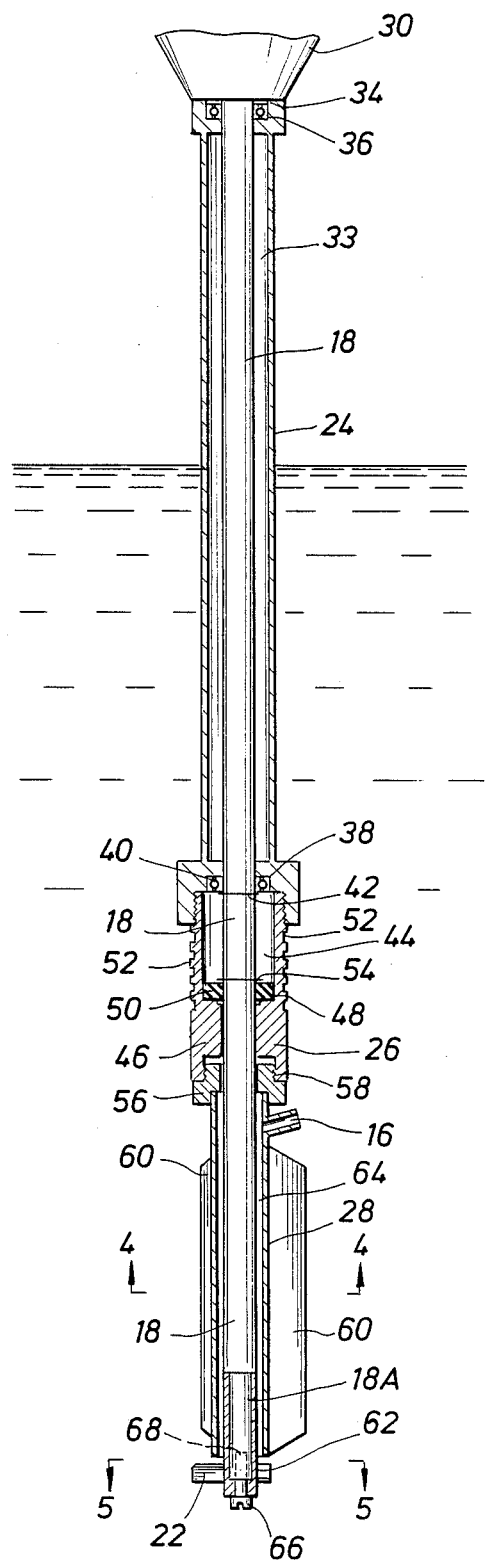

FIG. 7A
FIG. 7B
FIG. 9
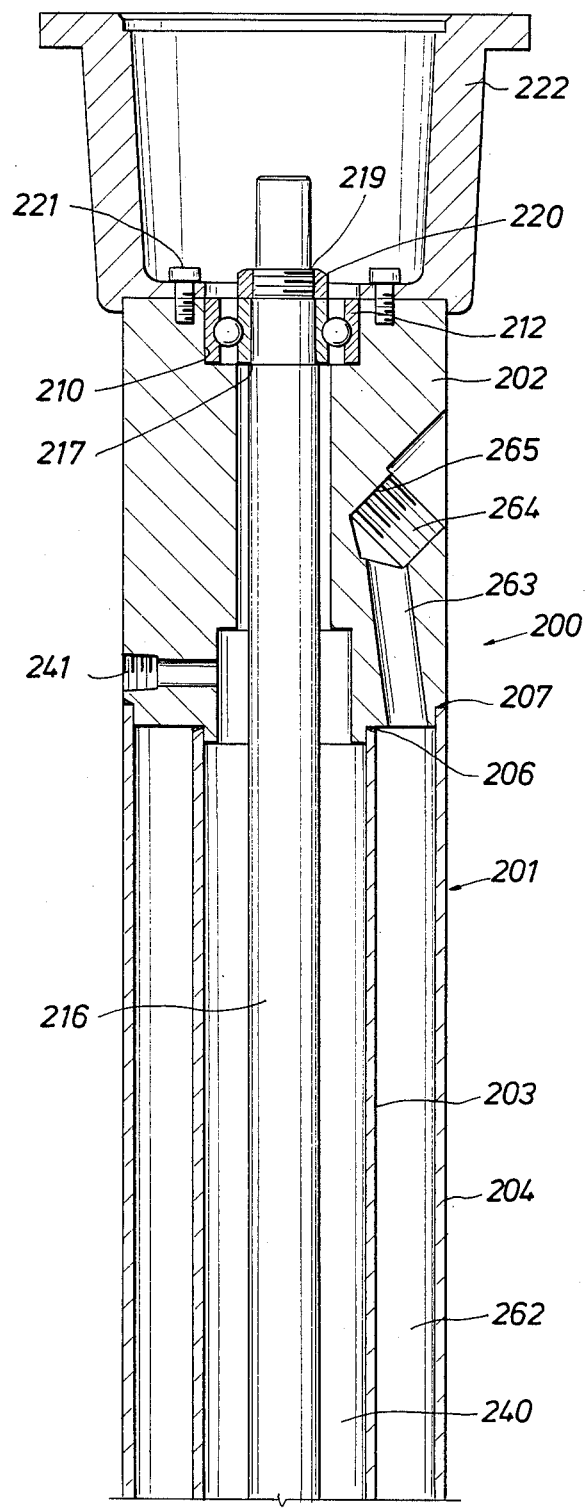
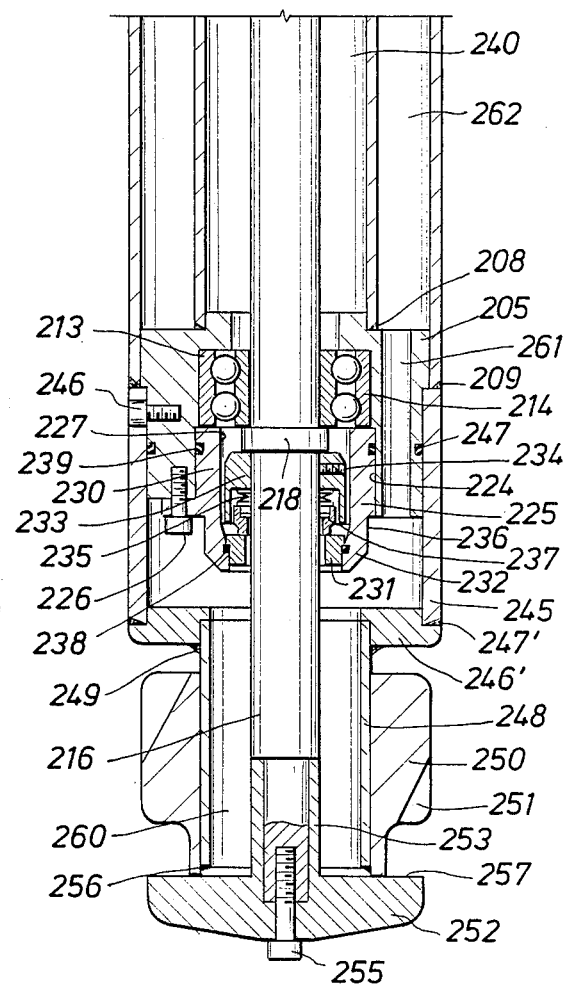
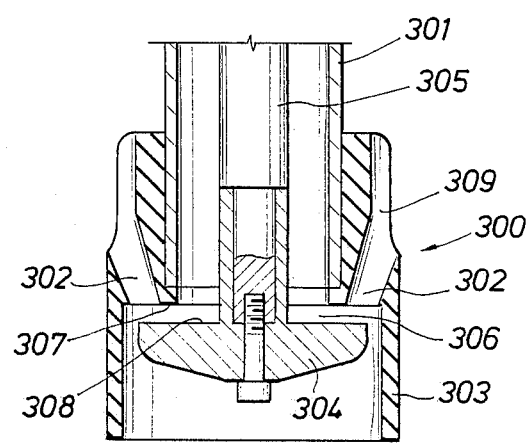

CHLORINE INDUCTION APPARATUS FOR TREATMENT OF WASTEWATER

CROSS-REFERENCE TO RELATED APPLICATION

This application is a continuation of U.S. application Ser. No. 115,172 filed Oct. 30, 1987 now abandoned which is a continuation-in-part of U.S. application Ser. No. 783,128 filed Oct. 2, 1985, now abandoned.

FIELD OF THE INVENTION

This invention relates generally to wastewater treatment systems, and particularly to a new and improved inductor apparatus for dispersing a treating agent such as chlorine gas in wastewater to disinfect the same in a highly efficient and cost-saving manner.

BACKGROUND OF THE INVENTION

Systems are known for applying a treating agent such as chlorine gas or sodium hypochlorite to wastewater. An example of a known device is the Aerocleve-Pentech jet disinfection system manufactured by Clevepak Corporation of Fall River, Mass. This system includes a converging reactor tube communicating the untreated liquid to a contact chamber containing the wastewater. A pump submerged in the wastewater pumps a mixture of treating fluid and untreated liquid through the reactor tube. This massive system requires a lifting device for installation and maintenance. Another prior system uses a supply of potable water run through a main trunk line to the contact chamber. A lateral chlorine line connected to the main trunk line pulls chlorine along with the potable water to the contact chamber. This system is very costly in both potable water and power requirements, and fails to give a desirable homogeneous mixture of treating fluids and wastewater.

A critical requirement in providing a cost effective system is to lower the costs of operating and maintaining the system while meeting the required effluent level criteria. For example, in a chlorination process the basic cost of operation includes the cost of chlorine, water and power usage. Also important to proper operation of the system is the ability to thoroughly mix the chlorine or other treating agent with the wastewater, and thereby reduce detention time in a contact chamber. It has been found that without a rigid maintenance program, wastewater plants can incur a large number of violations because of equipment malfunctions and downtime. A light-weight device for applying the treating agent is desirable so that a single person can perform the maintenance tasks.

It is therefore the general object of this invention to provide a new and improved chlorine gas induction system for disinfecting wastewater that eliminates the above-mentioned problems.

Another object of the invention to provide a new and improved chlorine inductor unit for disinfecting wastewater which does not require a supply of potable water, and which substantially reduces power and chemical usage.

Another object of this invention to provide a new and improved chlorine inductor system which is easy to operate and to maintain, at minimum costs.

Another object of the invention to provide a new and improved inductor unit for dispersing chlorine gas into wastewater which can be readily retrofitted to an existing plant site.

SUMMARY OF THE INVENTION

These and other objects are attained in accordance with the present invention through the provision of a chlorine inductor unit that includes a bearing frame having an upper bearing housing, a lower bearing housing, and a tubular member extending between said housings. A drive shaft extends axially through the bearing frame and is rotatably mounted by a closed bearing in the upper housing and an open bearing in the lower housing. A short-length vacuum tube, below the lower housing provides an outlet opening for chlorine gas, and a propeller that is attached to the lower end of the drive shaft rotates in close tolerance relationship to said opening so that wastewater is caused to flow at high velocity past the opening and create a low pressure therein. Such low pressure sucks chlorine gas out of the opening where it is mixed and dispersed into the wastewater. In one embodiment, the chlorine gas comes in through a side port in the vacuum tube above the opening, and in another embodiment the gas is sucked down through an internal passage in the bearing frame and into the top of the vacuum tube. In both cases, the need for auxiliary pumps and diffusers typically used in the prior art is eliminated, which provides a chlorinator that is vastly more energy efficient and reliable in operation than has been known. A particular form of the present invention can be used to inject a treating agent into wastewater flowing in a line pipe.

BRIEF DESCRIPTION OF THE DRAWINGS

The present invention has other objects, advantages and features which will become more clearly apparent with reference to the following detailed description of embodiments thereof, taken in conjunction with the appended drawings in which:

FIG. 1 is a schematic view of a chlorination system using the present invention;

FIG. 2 is an elevational view of the invention;

FIG. 3 is an enlarged sectional view of the invention taken along line 3—3 of FIG. 2;

FIG. 4 is an enlarged sectional view taken along line 4—4 of FIG. 3;

FIG. 5 is an enlarged sectional view taken along lines 5—5 of FIG. 3;

FIGS. 7A and 7B are cross-sectional views of another embodiment of the present invention, FIG. 7B being a lower continuation of FIG. 7A;

FIG. 9 is a longitudinal sectional view of a modified lower end portion of the present invention.

DETAILED DESCRIPTION OF PREFERRED EMBODIMENTS

Figure 6A:
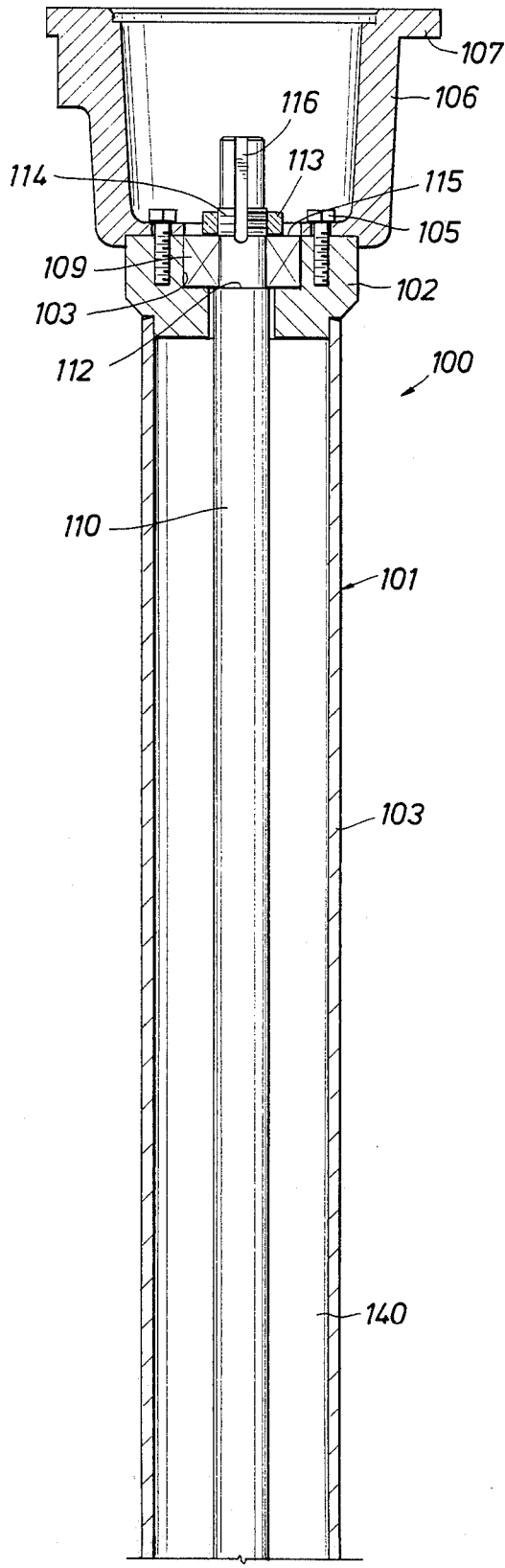
FIGS. 6A and 6B are cross-sectional views showing further structural details of an embodiment of the invention substantially similar to that illustrated in FIGS. 2 and 3, FIG. 6B forming a lower continuation of FIG. 6A.

A typical wastewater treatment facility which employs chlorine inductor units 10 embodying the present invention is shown schematically in FIG. 1. Chlorine gas contained in pressure vessels 2 is fed to a metering system 3 that is connected to a vacuum line 4. A contact chamber 5 has interconnected reverse flow compartments as shown, and one or more inductor units 10 are mounted by suitable brackets to a side wall of the first compartment as shown. Untreated wastewater from clarifiers 6 is fed to the first chamber where it is treated with chlorine gas in order to disinfect the same. The water then goes from one chamber to the next in order to provide a predetermined detention time, and eventually flows over a weir 7 where it is discharged into a stream.

Turning now to FIG. 2, the apparatus 10 comprises an elongated tubular assembly, generally designated 14, through which a drive shaft 18 extends. A motor 20 is mounted on the upper end thereof, and a propeller 22 having rotating blades is fixed to the lower end of the shaft. The lower end of the tubular assembly 14 is constituted by a vacuum tube 28 having an inlet port 16. High velocity wastewater flow due to rotation of the propeller 22 creates a low pressure region within the lower open end of the vacuum tube 28 that functions to suck chlorine gas through the inlet port 16 and tube 28 where it is discharged into the wastewater and dispersed therein in a recirculatory flow pattern that is formed within the compartment.

The upper section of the tubular assembly 14 comprises a bearing frame 24 and a seal housing 26. The seal housing 26 is disposed between the bearing frame 24 and the vacuum tube 28. In a preferred embodiment, the bearing frame 24, the seal housing 26 and the vacuum tube 28 all are fabricated from titanium to provide a light-weight unit that is highly resistant to corrosion.

The motor 20 preferably is an electric 2 HP motor having specifications of 3,450 RPM, PH3 and HZ60 with cast iron end bells. The motor 20 is connected to the bearing frame 24 by a mount 30. The mount 30 may be attached to a bracket 32 by which the unit 20 is mounted to the side of the contact chamber 5 with the lower portion of the unit immersed in the wastewater as shown in FIG. 2.

The bearing frame 24, as shown in further detail in FIG. 3, partially houses the drive shaft 18 in the central passageway 33. A top bearing 36 is disposed in an inwardly facing groove 34 in the upper housing of the bearing frame 24, and may be cooled by a forced air cooling fan (not shown) on the motor 20. A lower bearing 40 is disposed in an inwardly facing groove 38 in the lower housing of the bearing frame 24. The lower bearing 40 is submerged in the wastewater when the unit is in operation to enable the lower bearing to run at a temperature very close to ambient temperature. A retaining ring 42 can be used to secure the lower bearing in the groove 38.

The bore 44 of seal housing 26 is reduced in diameter by inwardly extending portion 46 to provide an upwardly facing shoulder 48. A mechanical seal 50, preferably a silicone/carbide vs. silicone/carbide face seal, is held on the shoulder 48 by retaining ring 54. The areas 32 and 44 contain a silicone oil or other nonhydrocarbon. The mechanical seal 50 seals the bearing frame 24 including the upper bearing 36 and the lower bearing 40 from corrosive fluids. Additionally, the seal 50 functions to seal the seal housing 26 from the vacuum tube 28 as will be discussed further below.

An adapter means 56 can be threaded to the seal housing 26 and attached to the vacuum tube 28. The inlet port 16 can be arranged at an angle to the side of the vacuum tube 28. A plurality of radially outwardly extending fins 60 can be disposed on the vacuum tube 28 adjacent its lower open end 62 to promote the mixing of gas with the wastewater flowing past the opening 62. Three plates are shown as radially disposed at 120 degrees about the exterior of the vacuum tube 28. These fins or plates 60 prevent vortices from forming that can have the effect of diminishing the hydrostatic seal created between the bottom edge of the vacuum tube 28 and the upper surfaces of the propeller 22. An annulus 64 is formed between the inner surface of the vacuum tube 28 and the outer surface of the shaft 18 through which the chlorine gas is conveyed.

The shaft 18 can have a reduced diameter portion 18A disposed at its lower end and on which an upwardly extending boss of the propeller 22 is positioned. The propeller 22 is attached to the shaft portion 18A by a bolt 66 received in a threaded bore 68 as shown in phantom lines. As best shown in FIG. 4, the drive shaft 18 is located axially of the vacuum tube 28.

Turning now to FIG. 5, the propeller or system of blades 22 is enlarged to better illustrate its details. The propeller 22 comprises three outwardly extending blades 70 spaced apart at 120 degrees about the hub 72. In a preferred embodiment, each blade has a horizontal portion 74 having a thickness of about 0.95 inches. The tip of each blade 70 is about 1.5 inches from the axis of the hub 72. In one embodiment, the overall length of the apparatus 10 is approximately four feet, eleven and one half inches.

The apparatus 10 may be used in any system that requires the application of a treating agent to a body of liquid. In FIG. 1, a gas chlorination process utilizing the present invention is illustrated, but other agents such as sodium hypochlorite can be injected for wastewater disinfection. Such wastewater can be from most any source, such as a municipal utility plant, papermill or a brewery. Four thousand (4,000) pounds per day of chlorine gas or ammonia or 6 gallons per minute of sodium hypochlorite can be induced by the apparatus 10 in normal operation.

With the lower portion of the apparatus 10 submerged two to three feet in the contact chamber, the electrical motor 20 rotates the propeller at high speed to create a relatively low pressure or vacuum within the lower end portion of the tube 28. The low pressure sucks or draws the chlorine gas from the chlorinator through the remote line 4 which is connected to the inlet port 16. The gas then is discharged into the liquid and dispersed, and the flow created by the propeller 22 circulates the water to the bottom of the tank where such flow is reflected upward and outward to achieve the desired homogeneous mixture.

The purpose of the vacuum tube 28 is to capture the low pressure that is created by the rotation of the propeller 22. The liquid moves in a circular motion that tends to form a cavity or vacuum in the center of the circle. This vacuum or low pressure draws the treating fluid from the chlorinator. The vacuum is maintained by the hydrostatic seal which is formed between the bottom edge of the vacuum tube 28 and the top edges of the propeller 22. This seal is accomplished by the downward flow of water around the outside of the vacuum tube 28.

The vortex inhibiting fins or plates 60 tend to prevent surface vortices from forming and being drawn down into the hydrostatic seal. It is believed that such a result would greatly reduce the vacuum being generated and reduce the amount of chlorine gas that could be applied into the wastewater. The propeller 22 is positioned in close proximity to the lower opening 62 of the vacuum tube 28 to create the maximum vacuum for drawing in of the gas via line 4.

Figure 6B:
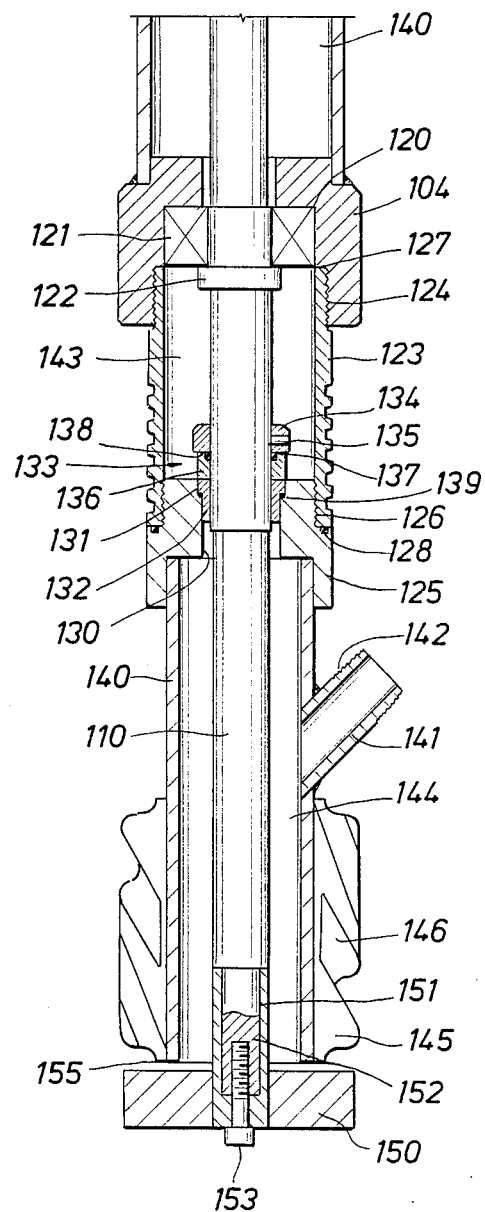

FIGS. 6A and 6B illustrate additional structural details of the chlorine gas inductor unit shown in FIGS. 2 and 3. The unit 100 includes a bearing frame 101 that preferably is a three-piece weldment of an upper bearing housing 102, an elongated tube 103 and a lower bearing housing 104. The upper housing 102 is bolted by studs 105 to a cast motor mount 106 having an upper flange 107 to which the drive motor 20 is secured by bolts or the like. The housing 102 has an internal recess 108 that receives a sealed bearing member 109 (like element 212 in FIG. 7A) through which the upper end portion of the drive shaft 110 passes. A shoulder 112 on the shaft 110 engages the lower side of the bearing 109, and a nut 113 is threaded onto the shaft at 114 to engage to upper side of the bearing. A lock washer 115 can be used to prevent back-off of the nut 113. A keyway 116 in the shaft 110 is used to couple the shaft to the output shaft of the drive motor 20.

The lower housing 104 also has an internal recess 120 that receives an open bearing member 121 (like element 214 in FIG. 7B). A shoulder 122 on the shaft 110 engages the lower face of the bearing member 121. A tubular member 123 has its upper end threaded to the housing 104 at 124, whereas the lower end of the member 123 is threaded to a seal housing 125 at 126. Seals 127, 128 can be provided to prevent leakage. The bore 130 of the housing 125 is provided with a counterbore 131 at its upper ends which receives the lower element 132 of a mechanical seal assembly 133, such assembly including a retainer ring 134 that is secured to the shaft 110 by a lock screw 135, and a seal member 136 having a face-seal engagement with the seal element 132. A spring such as a Bellville washer 137 urges the member 136 toward the element 132, and additional elastomer ring seals 138, 139 also prevent fluid leakage. The annular chamber space 140 between the shaft 143, the tube 103, and the member 123 above and below the bearing member 121 is filled at least partially with a nonhydrocarbon lubricating oil that will not react in a violent manner if it comes into contact with chlorine gas. The mechanical seal assembly 133 functions to prevent contamination of the oil with chlorine gas or wastewater.

A suitable structure can be provided to check the level of the oil in chamber 143, such as an elongated tube that is fixed to the member 103 on the outside thereof, with the lower end of the tube communicating with the bottom region of the chamber 140 adjacent the housing 104. A measuring device such as a dip stick can be inserted into the tube and withdrawn to visually ascertain the oil level.

Vacuum tube 140 is secured, preferably by welding, to the lower end of the mechanical seal housing 125. A chlorine gas inlet port is provided by a nipple 141 having a thread 142 by which it can be connected to a vacuum line which extends to a chlorine gas supply located at a remote site. The inner diameter of the tube 140 is considerably larger than the outer diameter of the shaft 110, as shown, to provide an annular gas flow passage 144 that communicates with the nipple 141. A collar 145 having a plurality of helical grooves 146 in its exterior surfaces is fixed on the vacuum tube 140 to inhibit the formation of vortices.

A propeller 150 having a hub 151 that is fitted on a reduced diameter portion 152 of the shaft 110 is rigidly secured to the lower end of the shaft by a threaded stud 153. The propeller 150 preferably is designed such that the direction of the principal flow of wastewater as the propeller turns is axially of the propeller, with very little if any outward flow component. An annular orifice 155 is formed by a close tolerance clearance space between the upper surface of the propeller 150 and the bottom end surface of the vacuum tube 140. As the propeller 150 is driven in rotation by the motor 20 via the shaft 110, a region of low pressure is formed in the opening 155 and within the interior of the vacuum tube by the action of the propeller 150 and the rush of wastewater at high velocity past the opening. Such low pressure, or vacuum, causes a supply of chlorine gas to be aspirated in through the nipple 141 and out through the annular orifice 155 to be mixed and dispersed in the wastewater in a highly efficient manner.

Another embodiment 200 of the present invention is illustrated in FIGS. 7A and 7B. This embodiment, which is particularly suited for what applicants refer to as "in-line" applications, includes a 4-piece bearing frame 201 that comprises an upper bearing housing 202, a pair of concentric tubes 203, 204 and a lower bearing housing 205. The upper housing 202 preferably is welded to the respective upper ends of the tubes 203, 204 at 206 and 207, and the lower housing 205 is welded to the lower ends thereof at 208, 209. An internal recess 210 in the upper housing 202 receives a sealed bearing member 212, and a similar recess 213 in the lower housing 205 receives an open bearing member 214. The sealed bearing member 212 has inner and outer races that support ball bearings as shown, and upper and lower seal discs to contain a lubricant and prevent any foreign matter from entering the bearing. The open bearing member 214 has inner and outer races and one or more rows of ball bearings, but is open above and below the bearings to permit continuous lubrication thereof by oil in the chamber 240. A drive shaft 216 that extends concentrically through the tubes 203, 204 has a shoulder 217 against the lower face of the bearing member 212, and a shoulder 218 against the lower face of the bearing member 214. A nut 219 is threaded onto the upper end portion of the shaft 216, and locked by a washer 220. Cap screws 221 are used to secure the motor mounting flange 222 to the top of the upper housing member 202. As in the case of the previous embodiment, a keyway (not shown) is employed to couple the shaft 216 to the output shaft of the electric drive motor 20. The nut 219 can be used to place a degree or tension in the shaft 216 to inhibit any wobble or whip thereof under high speed rotation.

The lower housing 205 also has a lower internal recess 224 that receives a mechanical seal support 225, such seal support being secured to the housing by cap screws 226. The support 225 has an internal bore 227 that receives a mechanical seal assembly 230 which includes a lower seal member 231 that rests on an internal flange 232, a retainer cap 233 fixed to the shaft 216 by a set screw 234, and a Bellville spring 235 that urges an upper seal member 236 into face-to-face contact with the lower seal member 231. Seal rings 237, 238 provide additional assurance against fluid leakage, as does a seal ring 239 between the support 225 and the housing 205. Thus arranged, the annular space 240 between the shaft 216 and the innermost tube 203 can be filled by a nonhydrocarbon oil which lubricates the bearing member 214 from above and below (since it is not sealed), with such oil being put into the space 240 via a fill port 241 in the housing 202 at the top of the space. A suitable instrument can be secured to the fill port 241 to monitor the oil level.

A tubular member 245 is fitted onto a reduced diameter section of the housing 205 and secured thereto by one or more cap screws 246. An O-ring 247 prevents fluid leakage. The lower end of the member 245 is welded to an adapter 246' at 247', which is welded to the upper end of a short-length vacuum tube 248 at 249. Applicants have found that the length of the tube 248 should be as short as possible to correspondingly reduce to a minimum the length of the drive shaft 216 that extends below the bearing 214, in order to minimize any whipping movement thereof during rotation of the propeller 252. As in the case of the previous embodiment, a collar 250 that is fixed on the vacuum tube 248 has external helical grooves 251 that impede the formation of vortices in the flow of wastewater as it goes past.

A propeller 252 having an upstanding boss 253 is attached to the lower end of the drive shaft 216 by a threaded stud 255. A narrow, close tolerance clearance space 256 is provided between the plane of the uppermost surfaces of the propeller 252, and the lower end face 257 of the vacuum tube 248. As the propeller 252 is driven in rotation by the motor 20 via the drive shaft 216, a region of low pressure is created in the lower end of the tube 248 and in the annular opening 256 which causes chlorine gas to be drawn down through the annulus 260 within the vacuum tube 248, a plurality of circumferentially spaced ports 261 in the housing 205, the annulas 262 between the inner and outer tubes 203 and 204, and through upper housing ports 263, 264 from a supply line (not shown) that is connected to the port 264 by tapered threads 265. Thus the chlorine gas is admixed with, and dispersed in, a high velocity flow of wastewater that is propelled by the propeller 252 past the opening 256 at the lower end of the vacuum tube 248.

Figure 8:
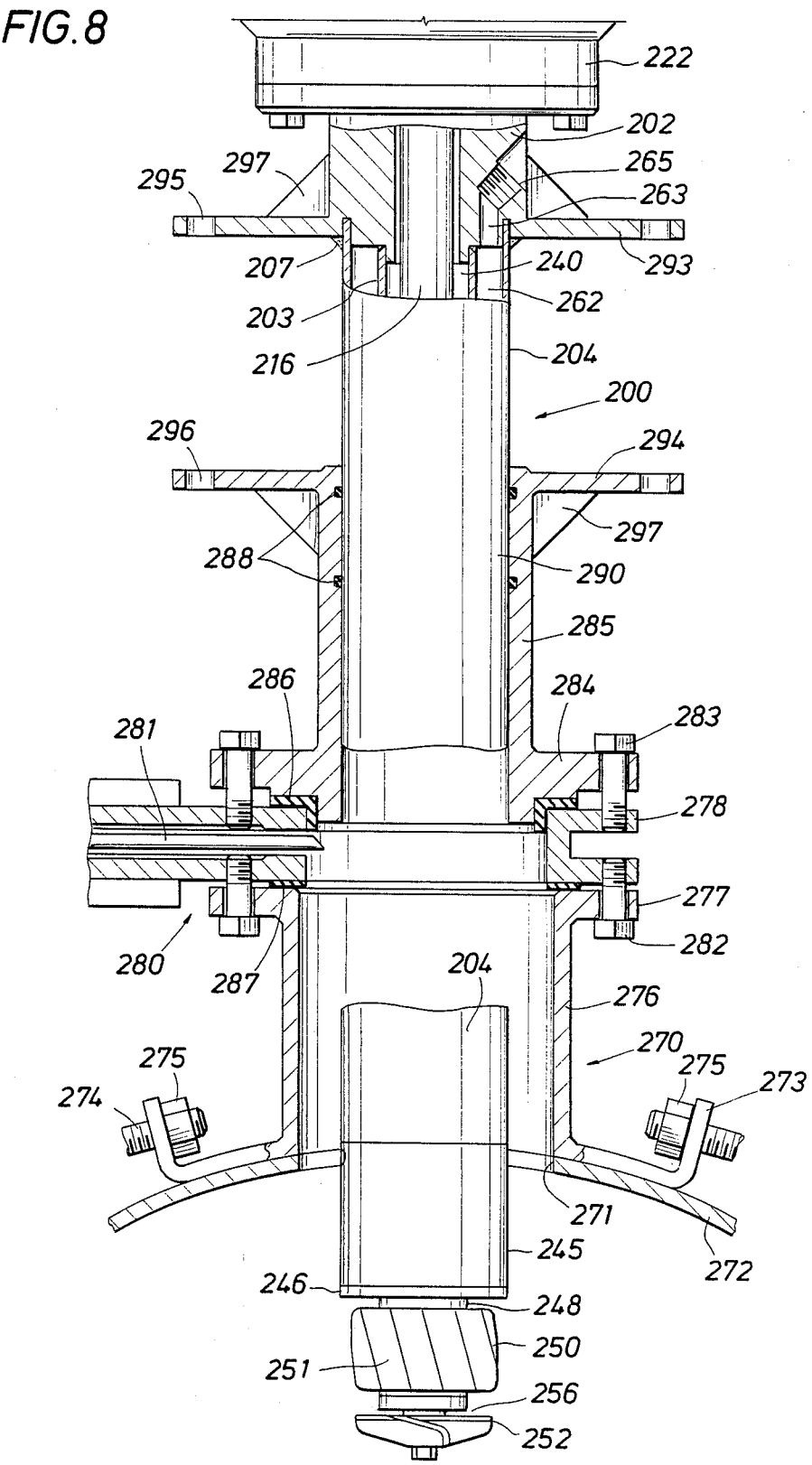
FIG. 8 is a sectional view, with some parts in side elevation, illustrating a mounting structure by which the embodiment of the invention shown in FIGS. 7A and 7B can be employed to induct chlorine gas into wastewater flowing in a line pipe.

The embodiment of the present invention shown in FIGS. 7A and 7B is particularly adapted for the injection of chlorine gas into a pipeline or other conduit carrying the wastewater to be treated, because of the unique location of the chlorine gas passages 262, 261 which are entirely within the body of the unit. As shown in FIG. 8, a tapping saddle 270 that mounts over an opening 271 in a large diameter line pipe 272 is held on the pipe by suitable means such as upturned flanges 273 that receive the threaded ends 274 of one or more straps which circumscribe the pipe. Nuts 275 which engage the threaded ends 274 are used to tension the straps to secure the saddle 270 on the pipe 272. The saddle 270 has a tubular spool 276 with a flange 277 at its outer end, such flange being connected by studs 282 to the body 278 of a gate valve 280 having, for example, a knife-like closure element 281 actuated by a suitable operator (not shown). The outer side of the valve body 278 is connected by studs 283 to the inner flange 284 of a seal spool 285. Suitable gaskets 286, 287 are employed to prevent fluid leakage at the inner and outer sides of the valve body 278. The seal spool 285 carries seal rings 288 on its inner periphery which seal against outer surfaces 290 of the outer housing member 204 of the chlorine gas inductor unit 200 shown in detail in FIGS. 7A and 7B, which can slide inward with respect to the spool 285 and through the valve 280 and the saddle 270 until a flange 293 on the bearing housing 202 comes down against an outer flange 294 on the seal spool 285. In such position, several bolts and nuts (not shown) are used to connect the flanges together using the bolt holes 295, 296 provided in the respective flanges. Gussets 297 can be used to strengthen the flanges 293, 294.

In operation, the tapping saddle 270 is mounted over the opening 271 in the line pipe 272 and secured by the straps 274 to provide a side entry into the interior of the pipe. The valve 280 is mounted on the saddle spool 276 as shown, and the valve element 281 is advanced to its closed position in order to prevent any flow of wastewater out of the opening 271. The spool 285 is mounted on the valve body 278.

When it is desired to inject chlorine gas or other disinfectant into wastewater flowing in the line 272, the lower end portion of the inductor unit 200 is inserted into the spool 285 until the propeller 252 is near the valve element 281. The valve 280 is opened to provide access to the interior of the pipe 272 via the opening 271. Thus the unit 200 then is forced through the open valve 280 until the propeller 252 is well within the interior of the pipe 272, and the flange 293 is against, or close to, the spool flange 294. Retaining bolts (not shown) are then positioned in the holes 295, 296 to secure the unit 200 to the spool 295. The gaskets 286, 287 and the O-rings 288 prevent fluid leakage, and of course a chlorine gas supply line from a remote source is connected to port 265. If the inductor unit 200 is to be inserted into the pipe 272 under pressure, elongated retaining bolts can be tightened to draw the flange 293 down against the flange 294 in order to telescope the unit 200 into the spools 285, 276 under pressure until the lower portion of the unit extends well within the bore of the pipe 272. If the pipe 272 is not under pressure at the time the unit 200 is installed, the flange 293 can be simply pushed down against the flange 294 by hand, and the flanges bolted together as described.

In any event, high speed rotation of the propeller 252 by an electric drive motor coupled to the drive shaft 216 will cause wastewater to flow at high velocity past the annular orifice 256 at the lower end of the vacuum tube 248, and cause chlorine gas to be sucked via the internal passage 262 and the orifice 256 and out into the wastewater where it mixes and is dispersed in a highly efficient and effective manner. The unit 200 can be removed from the pipe 272 at any time by raising the unit, and closing the valve 280.

As shown in FIG. 9, the lower end portion of the chlorine inductor unit can be modified to add a shroud member 300 that fits onto the lower end of the vacuum tube 301. The shroud member 300, which can be made of a plastic material, has a plurality of circumferentially spaced inlet ports 302 that lead to the interior thereof above a downwardly extending skirt 303 that surrounds the propeller 304. Thus as the propeller 304 is rotated by the shaft 305, wastewater is drawn into the interior of the shroud member 300 at high velocity via the ports 302 and past the annular orifice 306 formed between the lower surface 307 and the top edges 308 of the propeller blades. A region of vacuum or low pressure is thus formed which causes chlorine gas to be sucked down through the vacuum tube 301 and into the wastewater flow within the skirt 303. If desired, the upper portions of the passages 309 that lead to the ports 302 can be formed at an angle to the plane of rotation of the propeller 304 in order to provide a vortex inhibitor similar to the members 252, 145 and 60 of the previously described embodiments of the present invention.

It now will be recognized that a new and improved chlorine gas inductor unit has been provided that accomplishes all of the objectives of the invention. Since certain changes or modifications may be made without departing from the inventive concepts involved, it is the aim of the appended claims to cover all such changes and modifications falling within the true spirit and scope of the present invention.

What is claimed is:

1. Apparatus for use in treating wastewater with a disinfectant, comprising: a generally tubular bearing frame including an upper bearing housing, a lower bearing housing, and a tubular member extending between said housings; a drive shaft extending axially through said bearing frame and sized to provide a first annular chamber between said shaft and the inner wall of said tubular member; means for coupling the upper end of said shaft to a drive motor; an upper bearing member in said upper housing for rotatably supporting said drive shaft; a lower bearing member in said lower housing for rotatably supporting said drive shaft; a seal housing connected to the lower end of said lower housing; a seal assembly mounted in said seal housing for preventing passage of wastewater and disinfectant along said shaft toward said lower bearing member and for containing a supply of lubricating oil in said annular chamber; a short-length vacuum tube connected to said seal housing and extending downwardly thereof, said vacuum tube having an open lower end, there being a second annular space formed between said shaft and the inner wall of said vacuum tube; connection means for permitting a supply of disinfectant to be sucked into said vacuum tube above said open lower end; and propeller means attached to the lower end of said drive shaft in a position such that the upper surfaces of the blades of said propeller means are positioned closely adjacent said lower open end of said vacuum tube, whereby rotation of said propeller means causes wastewater to flow at high velocity downward past said open lower end to create a low pressure region within such open lower end that sucks disinfectant through said second annular space and out of said open lower end into mixing contact with the wastewater.

2. The apparatus of claim 1 wherein said bearing frame is formed as a weldment to enable the vertical distance between upper surfaces of said blades and the lower end surface of said vacuum tube to be maintained within close tolerance limits.

3. The apparatus of claim 1 further including means mounted on said vacuum tube for inhibiting the formation of vortices in the flow of wastewater past said vacuum tube.

4. The apparatus of claim 1 further including a downwardly facing shoulder on said lower housing, and an opposed, upwardly facing shoulder on said drive shaft, said lower bearing member being mounted between said shoulders.

5. The apparatus of claim 4 further including an upwardly facing shoulder on said upper housing, said upper bearing member being mounted on said upwardly facing shoulder, and a nut that is threaded onto the upper end portion of said drive shaft and engages said upper bearing member.

6. The apparatus of claim 1 wherein said upper bearing member is sealed to close the upper end of said first annular chamber, and said lower bearing member is open to expose movable parts thereof to said lubricating oil.

7. Apparatus for use in treating wastewater with a disinfectant, comprising: a generally tubular bearing frame including an upper bearing housing, a lower bearing housing, and a tubular member extending between said housings; a drive shaft extending axially through said bearing frame and sized to provide a first annular chamber between said shaft and the inner wall of said tubular member; means for coupling the upper end of said shaft to a drive motor; an upper bearing member in said upper bearing housing for rotatably supporting said drive shaft; a lower bearing member in said lower bearing housing for rotatably supporting said drive shaft; a seal housing connected to the lower end of said lower bearing housing; a seal assembly mounted in said seal housing for preventing passage of wastewater and disinfectant along said shaft toward said lower bearing member and for containing a supply of lubricating oil in said annular chamber a short-length vacuum tube connected to said seal housing and extending downwardly thereof, said vacuum tube having an open lower end, there being a second annular space formed between said shaft and the inner walls of said vacuum tube; connection means for permitting a supply of disinfectant to be sucked into said vacuum tube above said open lower end; propeller means attached to the lower end of said drive shaft in a position such that the upper surfaces of the blades of said propeller means are positioned closely adjacent said lower open end of said vacuum tube, whereby rotation of said propeller means causes wastewater to flow at high velocity downward past said open lower end to create a low pressure region within such open lower end that sucks disinfectant through said second annular spacer and out of said open lower end into mixing contact with the wastewater; and means mounted on said vacuum tube for inhibiting the formation of vortices in the flow of wastewater past said vacuum tube; said inhibiting means including a collar having external helical grooves therein for directing the flow of wastewater at acute angles to the plane of rotation of said propeller means.

8. Apparatus for use in treating wastewater with a disinfectant, comprising: a generally tubular bearing frame including an upper bearing housing, a lower bearing housing, and concentric tubular members extending between said housing; a drive shaft axially through said bearing frame, there being a first annular chamber between said shaft and the inner one of said concentric tubular members and a second annular chamber between said inner tubular member and the outer one of said tubular members; upper and lower bearing members mounted respectively in said upper and lower bearing housings for rotatably supporting said drive shaft; seal means in said bearing frame below said lower bearing member for preventing contamination of a lubricating oil contained in said first annular chamber with wastewater and disinfectant; means in said upper housing for filling said first chamber with a nonhydrocarbon lubricating oil; first passage means near the upper end of said second chamber for conveying disinfectant thereto; second passage means in said lower housing for conveying said disinfectant to a region below said lower housing; a short-length vacuum tube mounted to said lower housing and extending downwardly thereof, said vacuum tube having an open lower end, said vacuum tube surrounding a lower portion of said drive shaft and being spaced outwardly thereof to provide an annular passage in communication with said region; and propeller means on the lower end of said drive shaft and positioned closely adjacent said lower open end of said vacuum tube, whereby rotation of said propeller means causes wastewater to flow downward at high velocity past said open lower end and the creation of low pressure within the lower open end of said vacuum tube that causes disinfectant to be sucked downward through said first passage means, said second annular chamber, said second passage means and said annular passage and out said lower open end of said vacuum tube into mixing contact with said flow of wastewater.

9. The apparatus of claim 8 wherein said bearing frame is formed as a weldment to enable the vertical distance between upper surfaces of said propeller means and the lower end surface of said vacuum tube to be maintained within close tolerance limits.

10. The apparatus of claim 9 further including means mounted on said vacuum tube for inhibiting the formation of vortices in the flow of wastewater past said vacuum tube.

11. The apparatus of claim 8 further including a downwardly facing shoulder on said lower housing, said lower bearing member being mounted between said shoulder and an opposed shoulder on said drive shaft.

12. The apparatus of claim 11 further including an upwardly facing shoulder on said upper housing, said upper bearing member being mounted between said upwardly facing shoulder and a nut that is threaded onto the upper end portion of said drive shaft.

13. The apparatus of claim 12 wherein said upper bearing member includes sealing means to close the upper end of said first annular chamber and said lower bearing member is open to expose movable parts thereof to said lubricating oil.

14. The apparatus of claim 8 further including an outwardly directed flange on said upper bearing housing for mounting said apparatus on a tapping saddle in a manner such that the lower portion thereof including said vacuum tube and propeller extend into the bore of a line pipe to enable chlorine gas to be dispersed in wastewater flowing therein.

15. Apparatus for use in treating wastewater with a disinfectant, comprising: a generally tubular bearing frame including an upper bearing housing, a lower bearing housing, and concentric tubular members extending between said housings, a drive shaft extending axially through said bearing frame, there being a first annular chamber between said shaft and the inner one of said concentric tubular members and a second annular chamber between said inner tubular member and the outer one of said tubular members; upper and lower bearing members mounted respectively in said upper and lower housings for rotatably supporting said drive shaft; seal means in said bearing frame below said lower bearing member for preventing contamination of a lubricating oil contained in said first annular chamber; means in said upper housing for filling said first chamber with a nonhydrocarbon lubricating oil; first passage means near the upper end of said second chamber for conveying a disinfectant thereto; second passage means in said lower housing for conveying said disinfectant to a region below said lower housing; a short-length vacuum tube mounted to said lower housing and extending downwardly thereof, said vacuum tube having an open lower end, said vacuum tube surrounding a lower portion of said drive shaft and being spaced outwardly thereof to provide an annular passage in communication with said region; propeller means on the lower end of said drive shaft and positioned closely adjacent the lower open end of said vacuum tube, whereby rotation of said propeller means causes wastewater to flow downward at high velocity past said open lower end and the creation of low pressure within said lower open end of said vacuum tube that causes disinfectant to be sucked downward through said first passage means, said second annular chamber, said second passage means and said annular passage and out the lower open end of said vacuum tube into mixing contact with said flow of wastewater; said bearing frame being formed as a weldment to enable the vertical distance between upper surfaces of said propeller means and the lower end surface of said vacuum tube to be maintained within close tolerance limits; and means mounted on said vacuum tube for inhibiting the formation of vortices in the flow of wastewater past said vacuum tube; said inhibiting means including a collar having external helical grooves therein for directing the flow of wastewater at an acute angle to the plane of rotation at said propeller means.

16. A chlorine gas inductor unit adapted for dispersing such gas into wastewater in a line pipe, comprising: an elongated tubular bearing frame having a drive shaft extending axially thereof, said frame defining an internal passage with said shaft for flow of chlorine gas between said frame and said shaft; axially spaced bearing means in said frame for mounting said shaft for rotation with respect thereto; propeller means mounted on said drive shaft and arranged to be rotated thereby; and means for conveying chlorine gas from said internal passage to an opening adjacent said propeller means, said unit being constructed and arranged such that rotation of said propeller means causes low pressure within said conveying means and said internal passage which sucks chlorine gas therethrough and into mixing contact with wastewater in said line pipe; and means for mounting said unit on a line pipe such that said opening and said propeller means are within the interior of a line pipe.

17. A chlorine gas inductor unit adapted for dispersing such gas into wastewater in a line pipe, comprising: an elongated tubular bearing frame having a drive shaft extending axially thereof, said frame defining an internal passage for flow of chlorine gas; axially spaced bearing means in said frame for mounting said shaft for rotation with respect thereto; propeller means mounted on said drive shaft and arranged to be rotated thereby; means for conveying chlorine gas from said internal passage to an opening adjacent said propeller means, whereby rotation of said propeller means causes low pressure within said conveying means and passage means which sucks chlorine gas therethrough and into mixing contact with wastewater in said line pipe, means for mounting said unit on a line pipe such that said opening and said propeller means are within the interior of a line pipe; said mounting means comprising a tapping saddle structure adapted to be fixed over an opening in a line pipe, and spool means connected to said tapping saddle structure; and seal means between said spool means and said bearing frame for preventing leakage of wastewater therebetween.

18. The unit of claim 17 further including gate valve means between said tapping saddle structure and said spool means for allowing insertion of said unit into a line pipe until said propeller means and opening are positioned within the interior thereof.

19. The unit of claim 18 further including means on said bearing frame for releasably securing said unit to said spool means.

20. The unit of claim 19 wherein said releasable securing means includes an outwardly directed flange of said bearing frame arranged to be connected to a companion flange on said spool means.

21. Apparatus for use in inducting chlorine gas into wastewater, comprising: an elongated tubular bearing frame having an upper bearing housing at the upper end thereof and a lower bearing housing at the lower end thereof; a drive shaft extending axially of said bearing frame; bearing means in each of said housings for mounting said drive shaft for rotation therein; a mechanical seal housing secured to the lower end of said bearing frame below said lower bearing housing; face seal means mounted in said mechanical seal housing for preventing waste water or gas from entering said bearing frame; said drive shaft having a relatively short length portion thereof extending below said mechanical seal housing; propeller means mounted on said short length portion and being rotated by said drive shaft to cause a high velocity flow of wastewater in a downward direction; and orifice means connected to said mechanical seal housing and extending downwardly thereof to a location adjacent said propeller means, means for introducing chlorine gas into said orifice means, said high velocity flow and said orifice means creating a low pressure region that causes chlorine gas to be induced into and mixed with said flow and dispersed into the said wastewater in order to disinfect same.

22. The apparatus of claim 21 wherein the upper one of said bearing means is a sealed bearing and said lower one of said bearing means is an open bearing, said bearing frame defining a reservoir that contains a non-hydrocarbon lubricating oil.

23. The apparatus of claim 22 further including means including an access port adjacent the upper end of said bearing frame to enable monitoring of the level of said lubricating oil.

24. The apparatus of claim 21 further including shroud means surrounding said lower portion of said drive shaft and said propeller means, said orifice means including a plurality of circumferentially spaced ports in said shroud means through which wastewater is caused to flow by rotation of said propeller means.

25. The apparatus of claim 21 further including supply means for conducting chlorine gas to said orifice means in response to low pressure created in said region.

26. The apparatus of claim 25 wherein said supply means includes a conduit that extends externally of said bearing frame to said orifice means.

27. The apparatus of claim 25 wherein said supply means includes a conduit that extends internally of said bearing frame and externally on said drive shaft to such orifice means.

28. The apparatus of claim 21 wherein at least said drive shaft, said propeller means and said orifice means are constructed of a light-weight and corrosion resistant metal.

* * * * *